(12) United States Patent
Yoshikawa

(10) Patent No.: US 8,436,961 B2
(45) Date of Patent: May 7, 2013

(54) BACKLIGHT UNIT AND DISPLAY DEVICE

(75) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 117 days.

(21) Appl. No.: 13/258,574

(22) PCT Filed: Mar. 31, 2010

(86) PCT No.: PCT/JP2010/055859
§ 371 (c)(1),
(2), (4) Date: Sep. 22, 2011

(87) PCT Pub. No.: WO2010/116937
PCT Pub. Date: Oct. 14, 2010

(65) Prior Publication Data
US 2012/0013824 A1 Jan. 19, 2012

(30) Foreign Application Priority Data
Apr. 8, 2009 (JP) .................................. 2009-093563

(51) Int. Cl.
*G02F 1/13357* (2006.01)
*G09F 13/04* (2006.01)

(52) U.S. Cl.
USPC ................ 349/62; 349/56; 349/60; 362/97.2; 362/97.3

(58) Field of Classification Search .................... 349/56, 349/57, 58, 60, 62; 362/97.1, 97.2, 97.3
See application file for complete search history.

(56) References Cited

U.S. PATENT DOCUMENTS

| | | | | |
|---|---|---|---|---|
| 7,758,197 B2 * | 7/2010 | Choi et al. | ................... | 362/97.2 |
| 7,924,367 B2 * | 4/2011 | Hsiao et al. | ..................... | 349/61 |
| 2004/0257792 A1 * | 12/2004 | Yu et al. | ......................... | 362/31 |
| 2007/0009820 A1 | 1/2007 | Ueda | | |
| 2007/0058397 A1 | 3/2007 | Aoki et al. | | |
| 2009/0059118 A1 * | 3/2009 | Hsiao et al. | ..................... | 349/61 |
| 2010/0232140 A1 * | 9/2010 | Takeba | ......................... | 362/97.1 |
| 2012/0013824 A1 * | 1/2012 | Yoshikawa | ..................... | 349/62 |

FOREIGN PATENT DOCUMENTS

| | | |
|---|---|---|
| JP | 2004-186080 A | 7/2004 |
| JP | 2007-018903 A | 1/2007 |
| WO | 2006/059413 A1 | 6/2006 |

OTHER PUBLICATIONS

Official Communication issued in International Patent Application No. PCT/JP2010/055859, mailed on Jun. 15, 2010.

\* cited by examiner

*Primary Examiner* — Brian Healy
(74) *Attorney, Agent, or Firm* — Keating & Bennett, LLP

(57) ABSTRACT

A backlight unit including holding members capable of preventing occurrence of a noise caused when the members are brought into contact with an optical member such as a diffusion plate. A backlight unit (4) includes a chassis (14) including a surface (14*a*) housing light sources (12), an optical member (11) having a flat plate shape and disposed above the light sources, and members (25) holding the optical member and attached to the housing surface, wherein each of the holding members includes a portion (25*a*) holding the optical member, and paired leg portions (25*b* and 25*c*) extending from the holding portion, elastically deformable in a direction in which the leg portions approach/leave each other and including paired foot portions (25*d*) disposed at lower ends of the leg portions, at least one of the paired foot portions being placed in a manner slidable on the housing surface in the approaching/leaving direction.

18 Claims, 11 Drawing Sheets

BACKLIGHT UNIT AND DISPLAY DEVICE

TECHNICAL FIELD

The present invention relates to a backlight unit for use disposed behind a transmissive display panel such as a liquid crystal display panel to illuminate the display panel with light, and a display device including the backlight unit.

BACKGROUND ART

A liquid crystal display device including a transmissive liquid crystal display panel and a backlight unit is used as a flat-screen display device. The backlight unit is disposed behind the liquid crystal display panel. The backlight unit includes fluorescent lamps such as cold cathode fluorescent lamps (CCFLs) that define light sources, and is arranged to illuminate the liquid crystal display panel from behind with light emitted from the fluorescent lamps while controlling the properties of the emitted light. The light with which the liquid crystal display panel is illuminated passes through the display panel, making an image displayed visible on a front side of the liquid crystal display panel.

FIGS. 10A and 10B are views showing a schematic configuration of a conventional liquid crystal display device that is generally used. As shown in FIGS. 10A and 10B, a liquid crystal display device 50 includes a bezel 51, a liquid crystal display panel 52, and a backlight unit 53. The bezel 51 functions as a frame of the liquid crystal display panel 52, and is arranged to hold a border portion of the liquid crystal display panel 52. The liquid crystal display panel 52 includes two glass plates that are stuck to each other by filling liquid crystals between the glass plates.

The backlight unit 53 includes a frame 54, optical sheets 55 to 57, a diffusion plate 58, fluorescent lamps 59, a reflection sheet 60 and a backlight chassis 61. The frame 54 has the shape of a frame, and is arranged to fix the optical sheets 55 to 57 and the diffusion plate 58 to the backlight chassis 61, keeping them stacked.

The optical sheets 55 to 57 and the diffusion plate 58 are arranged to control the properties of light that is emitted from the fluorescent lamps 59 and enters the liquid crystal display panel 52. The optical sheets 55 to 57 are defined by a stack of three sheets of a diffusion sheet, a lens sheet and a reflective polarizing sheet, each of which has a thickness of 0.1 to 0.3 mm. The diffusion plate 58 is made of resin to have a thickness of about 2 mm, and is disposed under the optical sheets 55 to 57.

Disposing the diffusion plate 58 above the fluorescent lamps 59 enables uniform luminosity of the light within a light emitting surface of the diffusion plate 58 while preventing the fluorescent lamps 59 from casting their shadows (lamp images) on the light emitting surface. The reflection sheet 60 laid under the fluorescent lamps 59 is arranged to reflect the light emitted from the fluorescent lamps 59 toward the liquid crystal display panel 52.

The chassis 61 has the shape of a box of low height, and is capable of housing the plurality of fluorescent lamps 59. The light emitted from the plurality of fluorescent lamps 59 arranged in parallel inside the chassis 61 is, together with the light reflected from the reflection sheet 60, transmitted through the diffusion plate 58, the optical sheets 55 to 57 and the liquid crystal display panel 52, and is visually observed on the observer's side.

In this configuration, diffusion plate holding members 62, as disclosed in PTL1, are provided to stand on a lamp housing surface 61a of the backlight chassis 61. The diffusion plate holding members 62 are arranged to hold the diffusion plate 58 from below, which prevents the diffusion plate 58 from being warped by its own weight. Because shadows of the diffusion plate holding members 62 are casted to some degree on the light emitting surface of the diffusion plate 58, if the diffusion plate holding members 62 are disposed so as to hold the diffusion plate 58 at a center portion thereof, the shadows of the diffusion plate holding members 62 appear obtrusively in a center portion of the liquid crystal display panel 52. In order to make the shadows unobtrusive, the diffusion plate holding members 62 are disposed on either side of the center portion of the diffusion plate 58 so as to surround (sandwich) it as shown in FIGS. 10A and 10B.

CITATION LIST

Patent Literature
  PTL 1: JP2004-186080

SUMMARY OF INVENTION

Technical Problem

However, there arises a problem. When the fluorescent lamps 59 are turned on, the center portion of the diffusion plate 58 is warped toward the diffusion plate holding members 62 due to thermal expansion of the diffusion plate 58 caused by a hot environment inside the backlight chassis 61, and the tips of the diffusion plate holding members 62 are pushed by the diffusion plate 58. When the fluorescent lamps 59 are turned off and the center portion of the diffusion plate 58 warped due to the thermal expansion of the diffusion plate 58 becomes flat again, some portions of the tips of the diffusion plate holding members 62, the some portions being in contact with the diffusion plate 58, are rubbed against the diffusion plate 58, which causes a problem of making a noise.

To be specific, as shown in FIG. 11, when the center portion of the diffusion plate 58 is warped toward the diffusion plate holding members 62, pushing forces A are exerted obliquely downward on the portions, being in contact with the diffusion plate 58, of the tips of the diffusion plate holding members 62 disposed on the either side of the center portion of the diffusion plate 58 so as to surround (sandwich) it. Meanwhile, at this time, reaction forces B are exerted obliquely upward on some portions on the under surface of the diffusion plate 58, the some portions being in contact with the portions of the tips of the diffusion plate holding members 62.

If the fluorescent lamps 59 are turned off and the temperature inside the backlight chassis 61 declines, the temperature of the diffusion plate 58 declines accordingly. Consequently, the center portion of the diffusion plate 58 warped due to the thermal expansion becomes flat again, and friction is produced at this time by the reaction forces B exerted obliquely upward on the under surface of the diffusion plate 58, which causes a phenomenon of making a noise.

In order to overcome the problem described above, preferred embodiments of the present invention provide a backlight unit including holding members capable of preventing occurrence of a noise that is caused when the holding members are brought into contact with an optical member such as a diffusion plate, and a display device including the backlight unit.

Solution to Problem

One of preferred embodiments of the present invention provides a backlight unit including a chassis including a housing surface arranged to house a plurality of light sources, an optical member having a flat plate shape and disposed above the light sources, and holding members arranged to hold the optical member and attached to the housing surface, wherein each holding member includes a holding portion arranged to hold the optical member, and a pair of leg portions that extend from the holding portion, are elastically deformable in a direction in which the leg portions approach and leave each other, and include a pair of foot portions disposed at lower ends of the leg portions, at least one of the paired foot portions being placed in a manner slidable on the housing surface in the direction in which the leg portions approach and leave each other.

Because the backlight unit has the configuration described above that each holding member arranged to hold the optical member such as a diffusion plate includes the leg portions elastically deformable in the direction in which the leg portions approach and leave each other, and at least the one of the paired foot portions disposed at the lower ends of the leg portions is placed in the slidable manner on the housing surface, the paired leg portions open and close by the slide of the foot portions, which allows the holding portions to change their height with respect to the housing surface arranged to house the light sources. When the tips of the holding members are pushed by the warped optical member, the paired leg portions open to lower the height of the holding portions, that is, lower the positions where the holding portions are in contact with the optical member. Consequently, contact loads at the positions where the holding portions are in contact with the optical member can be lessened, which can prevent occurrence of a noise that is caused when the holding members are brought into contact with the optical member.

It is also preferable that ones of the paired foot portions are attached in a fixed manner to holes provided to the housing surface, and the other foot portions are attached in a slidable manner to holes provided to the housing surface. It is also preferable that ones of the paired foot portions are attached in a fixed manner to holes provided to the housing surface, and the other foot portions are placed in a slidable manner on the housing surface. It is also preferable that ones of the paired foot portions are attached in a slidable manner to holes provided to the housing surface, and the other foot portions are attached in a slidable manner to holes provided to the housing surface.

With any one of these configurations, at least the ones of the paired foot portions disposed at the lower ends of the leg portions can be placed in the slidable manner on the housing surface with a simple structure.

It is also preferable that the foot portions attached in the fixed manner are disposed closer to the center of the optical member while the other foot portions attached in the slidable manner are disposed closer to an outer region of the optical member. If the holding members having this configuration are disposed surrounding a center portion of the optical member, directions in which the holding members are pushed by the optical member when the center portion of the optical member is warped can be made to coincide with directions in which the foot portions slide. Thus, the foot portions can effectively slide in accordance with the warp of the optical member.

It is also preferable that each of the foot portions includes a flat portion that is in contact with the housing surface. With this configuration, the foot portions can slide on the housing surface more easily. If each of the flat portions has a rectangular shape, the flat portions can easily cover in the holes provided to the housing surface, which can prevent light from leaking from the holes.

It is also preferable that each of the foot portions has a trapezoidal shape in cross section. It is also preferable that each of the foot portions has a triangular shape in cross section. It is also preferable that each of the foot portions has a conical shape. With any one of these configurations, the foot portions can be prevented from casting their shadows, which occurs when each of the foot portions has a cubic shape. In addition, the foot portions are provided with inclined surfaces (reflection surfaces) that reflect light emitted from the light sources toward the optical member, so that use efficiency of the light emitted from the light sources and the luminosity within a light emitting surface of the optical member can be increased.

It is also preferable that the foot portions each include mounting portions that are insertable in and removable from the holes. With this configuration, a lighting inspection of the back light unit, and work of replacing the holding members during a maintenance operation can be performed easily. If the mounting portions each include hook portions and each of the hook portions has an L shape extending in a direction in which the foot portions slide, the foot portions can be easily attached to and detached from the holes, which allows the foot portions to slide easily.

It is also preferable that each of the holes has a long opening shape extending in a direction in which the foot portions slide. With this configuration, the opening areas of the holes that allow the foot portions to slide can be decreased, which can prevent light from leaking from the holes to the outside.

It is also preferable that each pair of the leg portions has an inverted V shape. With this configuration, the holding members can have a structure that allows the leg portions to be easily opened and closed.

It is also preferable that the light sources are fluorescent lamps, or light-emitting diodes. When those light sources are turned on, the optical member is warped due to thermal expansion of the optical member caused by a hot environment inside the backlight unit, so that the use of the holding members can prevent occurrence of a noise that is caused when the holding members are brought into contact with the optical member.

In another aspect of the present invention, a display device includes a display panel having an image display region, and the backlight described above that is disposed behind the display panel to illuminate the display panel with light. With this configuration, because occurrence of a noise that is caused when the holding members are brought into contact with the optical member is prevented, the quality of the display device can be improved. It is preferable that the display panel is a liquid crystal display panel. With this configuration, the liquid crystal display panel that is generally used as a transmissive display panel can be used with the backlight unit according to the preferred embodiments of the present invention.

Advantageous Effects of Invention

According to the preferred embodiments of the present invention, the backlight unit has the configuration that each of the holding members arranged to hold the optical member such as the diffusion plate includes the leg portions elastically deformable in the direction in which the leg portions approach and leave each other, and at least one of the paired foot portions disposed at the lower ends of the leg portions is placed in the slidable manner on the housing surface. Thus, when the optical member is warped toward the holding members and pushes the holding portions of the holding members, the paired leg portions slide, whereby the contact loads at the positions where the holding portions are in contact with the optical member can be lessened. Consequently, occurrence of a noise that is caused when the holding members are brought into contact with the optical member can be prevented.

DESCRIPTION OF EMBODIMENTS

A detailed description of a backlight unit and a display device according to preferred embodiments of the present invention will now be provided with reference to the accompanying drawings. In the preferred embodiments of the present invention, a liquid crystal display device including a backlight unit, and a liquid crystal panel disposed on a light emitting surface of the backlight unit is explained as an example.

(First Preferred Embodiment)

Figure 1:
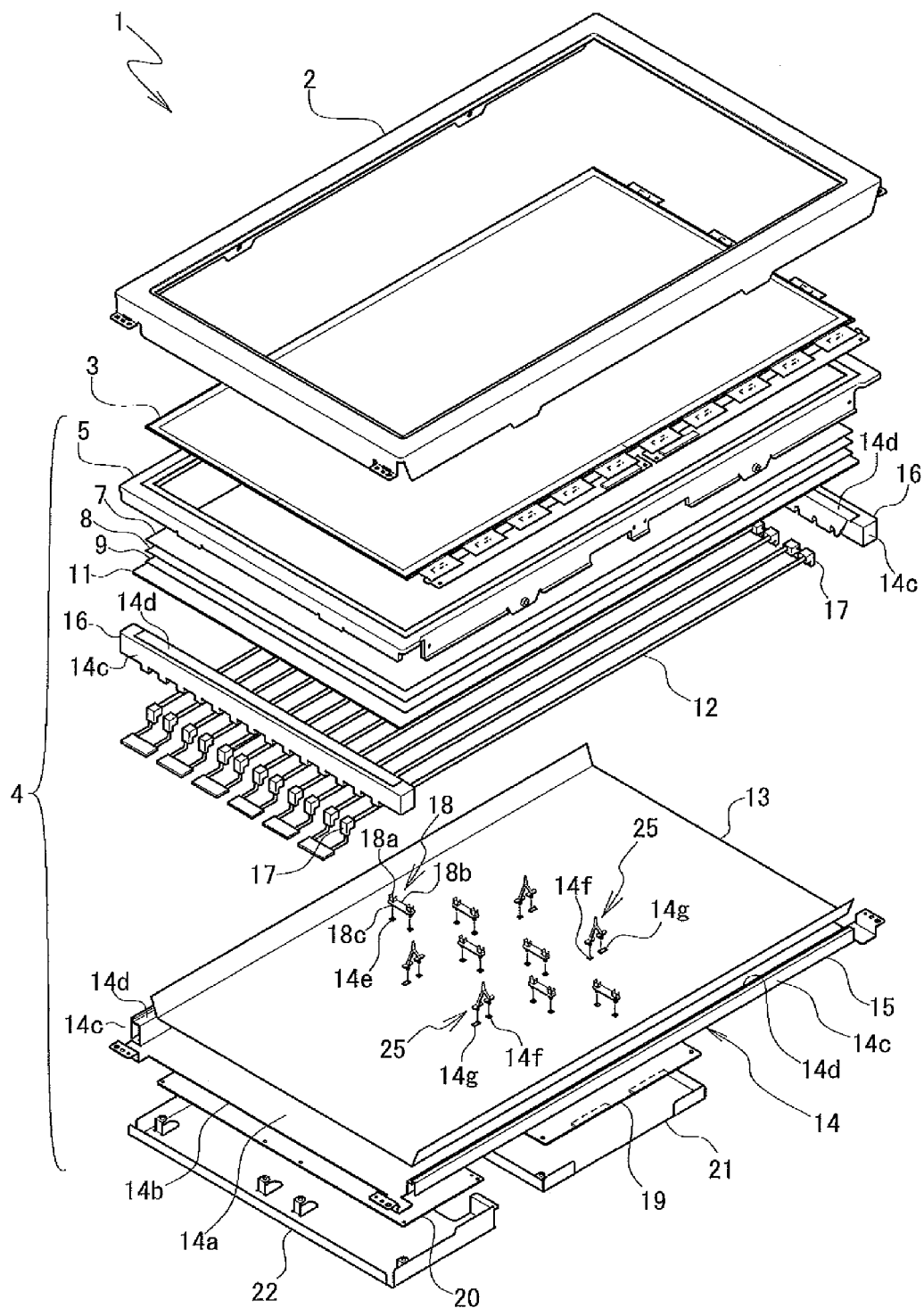
FIG. 1 is an exploded perspective view showing a schematic configuration of a liquid crystal display device according to a first preferred embodiment of the present invention.

FIG. 1 is an exploded perspective view showing a schematic configuration of a liquid crystal display device 1 according to a first preferred embodiment of the present invention. As shown in FIG. 1, the liquid crystal display device 1 includes a bezel 2, a liquid crystal display panel 3, and a backlight unit 4. The bezel 2 has the shape of a frame so as to cover a border portion of the liquid crystal display panel 3. The bezel 2 ensures, together with a backlight chassis 14 to be described later, the strength of the entire liquid crystal display device 1. The liquid crystal display panel 3 includes two glass plates that are stuck to each other by filling liquid crystals between the glass plates, and is arranged to display an image on its front side.

The backlight unit 4 includes a frame 5, optical sheets 7 to 9, a diffusion plate 11, fluorescent lamps 12, a reflection sheet 13 and the backlight chassis 14. The frame 5 has the shape of a frame, and is arranged to fix the optical sheets 7 to 9 and the diffusion plate 11 to the backlight chassis 14, keeping them stacked. The optical sheets 7 to 9 and the diffusion plate 11 define optical members arranged to control the properties (e.g., refraction, diffraction, reflection) of light that is emitted from the fluorescent lamps 12 and enters the liquid crystal display panel 3.

The diffusion plate 11 has a rectangular plate shape when seen from its top, and is made of resin. The diffusion plate 11 is arranged to diffuse light emitted from the fluorescent lamps 12, enabling uniform luminance distribution of the light within its light emitting surface. The diffusion plate 11 has a thickness of about 2 to 3 mm.

Each of the three optical sheets 7 to 9 has a thin sheet shape. Each of the three optical sheets 7 to 9 has a rectangular shape when seen from their tops. The three optical sheets 7 to 9 are made of resin. For example, the optical sheets 7 to 9 are defined by a reflective polarizing sheet 7, a lens sheet 8 and a diffusion sheet 9 stacked in this order from the top on the diffusion plate 11, each of which has a thickness of about 0.1 to 0.5 mm.

The diffusion sheet 9 is arranged to further diffuse the light from the diffusion plate 11, enabling uniform luminance distribution of the light. The lens sheet 8 is arranged to gather the light from the diffusion sheet 9, increasing luminosity of the light seen from the front. The reflective polarizing sheet 7 is arranged to selectively reflect the light from the lens sheet 8 so that the light from the lens sheet 8 may not be absorbed in a polarizing plate attached to the under surface of the liquid crystal display panel 3.

Thus, the backlight unit 4 can change the linear light emitted from the fluorescent lamps 12 into planar light by the optical sheets 7 to 9 and the diffusion plate 11. To be specific, the backlight unit 4 can eliminate shadows of the fluorescent lamps 12 (lamp images), and can project the light onto the liquid crystal display panel 3 from behind.

Straight tubular cold cathode fluorescent lamps (CCFLs) are used as the fluorescent lamps 12. Electrodes (not shown) are provided at both ends of each fluorescent lamp 12. Electrode holders 17 are attached to the electrodes so as to be fixed to the backlight chassis 14. Fluorescent lamps having a diameter of about 3 to 4 mm are used as the fluorescent lamps 12 because those fluorescent lamps are excellent in luminous efficiency.

Under the fluorescent lamps 12, the reflection sheet 13 is laid on a bottom plate 14b of the backlight chassis 14. The reflection sheet 13 is arranged to reflect the light emitted from the fluorescent lamps 12 toward the liquid crystal display panel 3. The reflection sheet 13 is made of resin to have a thickness of about 0.1 to 2 mm. The surface of the reflection sheet 13 that faces the fluorescent lamps 12 is preferably painted white so that the light emitted from the fluorescent lamps 12 is efficiently reflected toward the diffusion plate 11, which increases use efficiency of the reflected light and the luminosity within the light emitting surface of the optical member.

Figure 2:
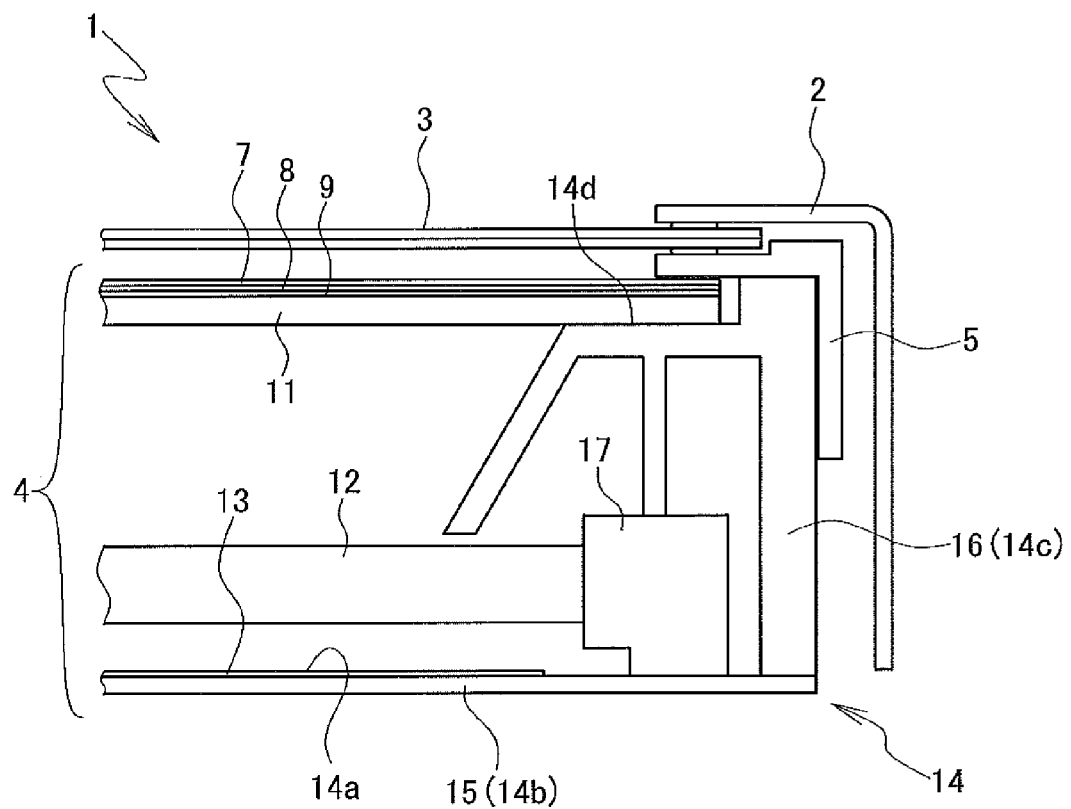
FIG. 2 is an enlarged cross-sectional view showing a border portion of the liquid crystal display device according to the first preferred embodiment of the present invention.

The chassis 14 has the shape of a box of low height. The chassis 14 includes the bottom plate 14b, side walls 14c provided along the longer sides of the chassis 14, the bottom plate 14b and the side walls 14c making up a chassis member 15 made of metal, and side walls 14c provided along the shorter sides of the chassis 14, the side walls 14c defining side walls of side holders 16 made of resin. By laying the reflection sheet 13 on the bottom plate 14b of the backlight chassis 14, a lamp housing surface 14a arranged to house the fluorescent lamps 12 is provided as shown in FIG. 2. The electrode holders 17 attached to the ends of the fluorescent lamps 12 are housed in the side holders 16 as shown in FIG. 2.

Support faces 14d for supporting an optical member are provided at the lower tiers of top ends of the side walls 14c of the backlight chassis 14 as shown in FIG. 2. Border portions of the diffusion plate 11 and the optical members 7 to 9 are supported on the support faces 14d, and fixed to the backlight chassis 14 by the frame 5.

In order to fix the fluorescent lamps 12 to the lamp housing surface 14a of the backlight chassis 14, the electrode holders 17 described above and lamp clips 18 arranged to hold the fluorescent lamps 12 at intermediate positions of the fluorescent lamps 12 are used. In this configuration, the backlight unit 4 includes the six lamp clips 18 as shown in FIG. 1. Thus, the six lamp clips 18 can hold the twelve fluorescent lamps 12 at the intermediate positions of the fluorescent lamps 12 on the lamp housing surface 14a.

Each of the lamp clips 18 includes lamp holding portions 18a each of which has a circular shape with an opening on the top, and a plate portion 18b having a rectangular shape, where the lamp holding portions 18a are disposed spaced a given distance apart on the top surface of the plate portion 18b. Mounting portions 18c are provided to an under surface of each plate portion 18b, with which the lamp clips 18 are capable of being attached to holes 14e for clip attachment provided to the lamp housing surface 14a. Thus, the fluorescent lamps 12 are held by the lamp clips 18 on the lamp housing surface 14a while the space between the fluorescent lamps 12 and the diffusion plate 11, and the space between the fluorescent lamps 12 and the reflection sheet 13 are fixed.

The lamp clips 18 are preferably transparent or white flexible molded components made of resin, so that they can prevent the luminosity of the light from locally decreasing due to the lamp clips 18 and can hold the fluorescent lamps 12 in a stable manner. As shown in FIG. 1, the six lamp clips 18 are disposed in a staggered arrangement with respect to the center line in the longer direction of the lamp housing surface 14a so that the six lamp clips 18 are not in alignment. Thus, the luminosity of the light can be prevented from locally decreasing due to the lamp clips 18.

An inverter circuit board 20 arranged to generate a high pulse voltage to turn on the fluorescent lamps 12, and a control circuit board 19 arranged to control the driving of the liquid crystal display panel 3 are attached to the back surface of the backlight chassis 14. An inverter circuit board cover 22 and a control circuit board cover 21 are arranged to cover the inverter circuit board 20 and the control circuit board 19, respectively.

As shown in FIG. 1, four diffusion plate holding members 25 are provided to the backlight unit 4, and arranged to hold the diffusion plate 11 from the inside of the backlight unit 4. The four diffusion plate holding members 25 are disposed symmetric with respect to the center of the diffusion plate 11. In these preferred embodiments, the four diffusion plate holding members 25 are disposed at four positions to evenly surround a center portion of the diffusion plate 11 as shown in FIG. 1, so that the diffusion plate 11 of which the center portion is warped downward can be held with its balance maintained.

Figure 3A:
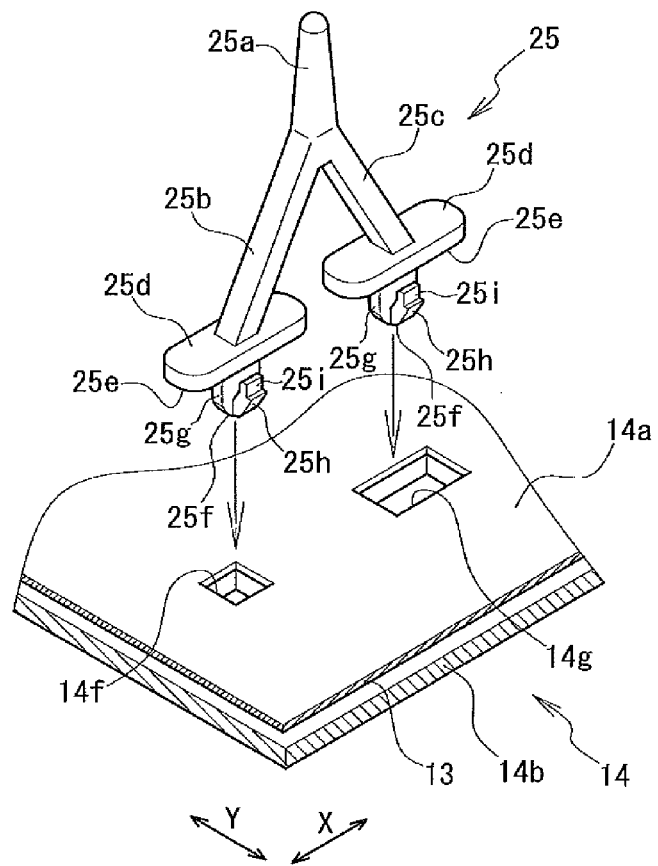
FIG. 3A is an enlarged external perspective view showing a diffusion plate holding member according to a first preferred embodiment of the present invention.
Figure 3B:
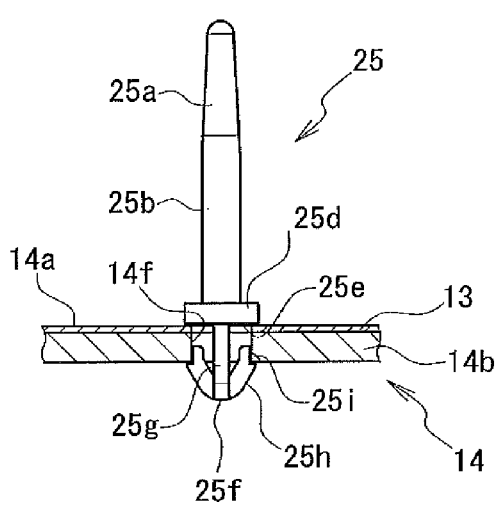
FIG. 3B is a cross-sectional view showing one of leg portions provided to the diffusion plate holding member, where the one leg portion is attached to a lamp housing surface.
Figure 3C:
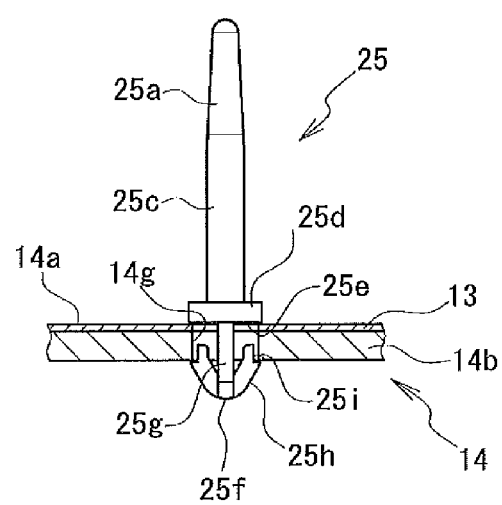
FIG. 3C is a cross-sectional view showing the other leg portion provided to the diffusion plate holding member, where the other leg portion is attached to the lamp housing surface.

As shown in FIG. 3A, each diffusion plate holding member 25 includes a holding portion 25a having the shape of a slim pin tapering off to the upper end, and a pair of leg portions 25b and 25c that extend from the lower end of the holding portion 25a so as to laterally leave each other gradually from the upper end to the lower end. The paired leg portions 25b and 25c have an inverted V shape and are elastically deformable in a direction in which they approach and leave each other (the X-direction shown in FIG. 3A). FIG. 3B is a cross-sectional view showing how the diffusion plate holding member 25 is attached to the lamp housing surface 14a, which is seen from the side of the leg portion 25b. FIG. 3C is a cross-sectional view showing how the diffusion plate holding member 25 is attached to the lamp housing surface 14a, which is seen from the side of the leg portion 25c.

Each diffusion plate holding member 25 includes a pair of foot portions 25d disposed at the lower ends of the leg portions 25b and 25c, each of the foot portions 25d having a rectangular shape extending in the direction in which the leg portions 25b and 25c approach and leave each other (the X-direction shown in FIG. 3A).

The foot portions 25d each include flat portions 25e that define under surfaces of the foot portions 25d, and the flat portions 25e each include mounting portions 25f. Each of the mounting portions 25f includes a base portion 25g that extends downward from the flat portion 25e, and a pair of locking portions 25h that extends from the lower end of the base portion 25g obliquely upward in the Y-direction shown in FIG. 3A. The locking portions 25h each include receded portions 25i disposed at the top ends on the outer surfaces of the locking portions 25h. The width in the X-direction of each base portion 25g is larger than the width in the X-direction of each locking portion 25h, and the locking portions 25h are disposed in the middle of the base portions 25g.

Each of the diffusion plate holding members 25 is arranged to be attached to a hole 14f for attaching a holding member in a fixed manner and a hole 14g for attaching a holding member in a slidable manner that are provided to the lamp housing surface 14a provided by the reflection sheet 13 and the backlight chassis 14 as shown in FIG. 3A.

Each of the holes 14f has a square shape. The width in the X-direction of each hole 14f is larger than the width in the X-direction of each base portion 25g of each mounting portion 25f of each diffusion plate holding member 25. The width in the Y-direction of each hole 14f is smaller than the width between the receded portions 25i of the locking portions 25h of each mounting portion 25f of each diffusion plate holding member 25.

When the mounting portion 25f of the leg portion 25b is inserted in the hole 14f, the locking portions 25h are firstly warped inward to be deformed, and after the receded portions 25i protrude from the under surface of the hole 14f, the locking portions 25h recover their forms to lock the mounting portion 25*f* in the hole 14*f* while the receded portions 25*i* are biased toward the inner surface of the hole 14*f*. Thus, the mounting portion 25*f* of the leg portion 25*b* of the diffusion plate holding member 25 is attached in the fixed manner to the hole 14*f* of the lamp housing surface 14*a* as shown in FIG. 3B.

In order to detach the mounting portion 25*f* from the hole 14*f*, the locking portions 25*h* are warped inward to release the lock by the receded portions 25*i* and raised upward, which allows easy detachment of the mounting portion 25*f*.

Each of the holes 14*g* has a rectangular shape. The width in the X-direction of each hole 14*g* (a direction in which each foot portion 25*d* of each leg portion 25*c* slides) is smaller than the length in a longer direction of each foot portion 25*d*, i.e., the X-direction.

The width in the Y-direction of each hole 14*g* (a direction perpendicular to the direction in which each foot portion 25*d* of each leg portion 25*c* slides) is larger than the width between the receded portions 25*i* of the locking portions 25*h* of each mounting portion 25*f* of each diffusion plate holding member 25, and smaller than the width between the locking portions 25*h* as shown in FIG. 3C. This configuration enables the foot portion 25*d* of the leg portion 25*c* that is attached to the hole 14*g* via the mounting portion 25*f* to be slidable in the X-direction.

When the mounting portion 25*f* of the leg portion 25*c* is inserted in the hole 14*g*, the locking portions 25*h* are firstly warped inward to be deformed, and after the receded portions 25*i* protrude from the under surface of the hole 14*g*, the locking portions 25*h* recover their forms; however, the mounting portion 25*f* is not locked in the hole 14*g* and the receded portions 25*i* are not biased toward the inner surface of the hole 14*g*. Thus, the mounting portion 25*f* of the leg portion 25*c* of the diffusion plate holding member 25 is attached in the slidable manner to the hole 14*g* of the lamp housing surface 14*a* as shown in FIG. 3C.

In this case, though the mounting portion 25*f* is not locked in the hole 14*g* by the receded portions 25*i*, the configuration that the width in the Y-direction between the locking portions 25*h* are larger than the width in the Y-direction of the hole 14*g* prevents the mounting portion 25*f* from being accidentally detached out of the hole 14*g*. In addition, the flat portion 25*e* of the foot portion 25*d* is large enough to cover in the hole 14*g* even if the foot portion 25*d* slides, which prevents light leaking from the hole 14*g* to the outside.

Figure 4:
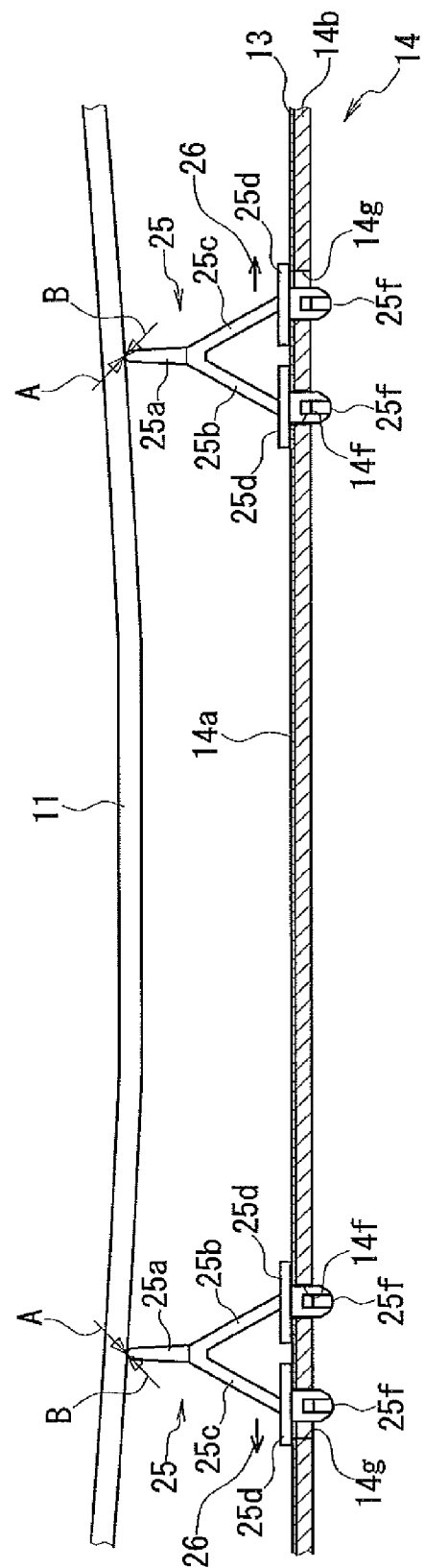
FIG. 4 is a cross-sectional view showing the diffusion plate holding members and the diffusion plate, where the diffusion plate holding members hold the diffusion plate.

The two diffusion plate holding members 25 are disposed so as to surround (sandwich) the center portion of the diffusion plate 11 as shown in FIG. 4. In this configuration, the holes 14*f* to which the two diffusion plate holding members 25 are to be attached are disposed inner than the holes 14*g* (disposed closer to the center of the diffusion plate 11) on the lamp housing surface 14*a*. The holes 14*g* to which the two diffusion plate holding members 25 are to be attached are disposed outer than the holes 14*f* (disposed closer to an outer region of the diffusion plate 11) on the lamp housing surface 14*a*.

Accordingly, the foot portions 25*d* attached to the holes 14*f* in the fixed manner are disposed closer to the center of the diffusion plate 11 while the other foot portions 25*d* attached to the holes 14*g* in the slidable manner are disposed closer to the outer region of the diffusion plate 11.

In the configuration that the diffusion plate holding members 25 are disposed so as to surround (sandwich) the center portion of the diffusion plate 11 as shown in FIG. 4, directions in which the diffusion plate holding members 25 are pushed by the diffusion plate 11 when the center portion of the diffusion plate 11 is warped (the directions of the pushing forces A shown in FIG. 4) are made to coincide with directions in which the foot portions 25*d* of the leg portions 25*c* slide (the directions indicated by the arrows 26 shown in FIG. 4). Thus, the foot portions 25*d* can effectively slide in accordance with the warp in the center portion of the diffusion plate 11.

As shown in FIG. 4, when the fluorescent lamps 12 are turned on, the center portion of the diffusion plate 11 is warped toward the diffusion plate holding members 25 due to thermal expansion of the diffusion plate 11 caused by a hot environment inside the backlight chassis 14, and the tips of the holding portions 25*a* of the diffusion plate holding members 25 are pushed by the diffusion plate 11.

As described above, when the center portion of the diffusion plate 11 is warped toward the diffusion plate holding members 25, the pushing forces A are exerted obliquely downward on some portions, which are in contact with the diffusion plate 11, of the tips of the holding portions 25*a* of the diffusion plate holding members 25 disposed on the either side of the center portion of the diffusion plate 11 so as to surround (sandwich) it. Meanwhile, at this time, reaction forces B are exerted obliquely upward on some portions on the under surface of the diffusion plate 11, which are in contact with the portions of the tips of the holding portions 25*a* of the diffusion plate holding members 25.

However, the pushing forces A and the reaction forces B at the contact portions between the holding portions 25*a* and the diffusion plate 11 can be lessened compared with a conventional backlight unit because the foot portions 25*d* of the leg portions 25*c* of the diffusion plate holding members 25 slide outward (to the directions indicated by the arrows 26 shown in FIG. 4) to slightly lower the height of the holding portions 25*a* when the center portion of the diffusion plate 11 is warped toward the diffusion plate holding members 25. Consequently, contact loads at the positions where the holding portions 25*a* are in contact with the diffusion plate 11 can be lessened compared with the conventional backlight unit.

When the fluorescent lamps 12 are turned off and the temperature inside the backlight chassis 14 declines, the temperature of the diffusion plate 11 declines accordingly. Thus, when the center portion of the diffusion plate 11 warped due to the thermal expansion becomes flat again, the foot portions 25*d* of the diffusion plate holding members 25, which have slid outward, slide back inward (to the directions opposite to the directions indicated by the arrows 26 shown in FIG. 4) accordingly, and the height of the holding portions 25*a* goes back to the original height, which can prevent the portions of the tips of the holding portions 25*a* that are in contact with the diffusion plate 11 from being rubbed against the under surface of the diffusion plate 11, and prevent occurrence of a noise that is caused by the rubbing, which occurs in the conventional backlight unit.

(Second Preferred Embodiment)

Figure 5A:
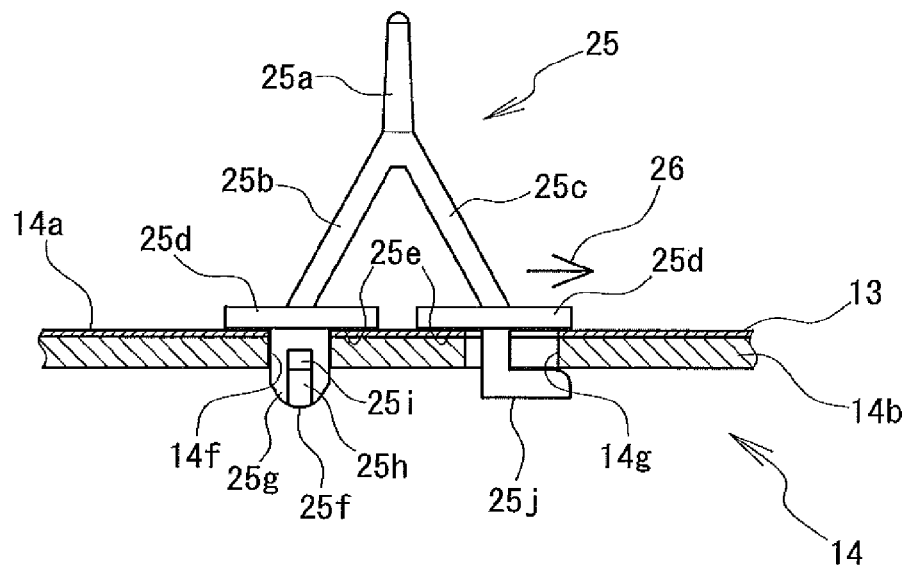
FIG. 5A is a cross-sectional view showing a diffusion plate holding member according to a second preferred embodiment of the present invention and the diffusion plate, where the diffusion plate holding member is attached to the lamp housing surface.

In the first preferred embodiment of the present invention described above, the configurations that the flat portions 25*e* of the foot portions 25*d* of the paired leg portions 25*b* and 25*c* of each diffusion plate holding member 25 each include the mounting portions 25*f* that have the identical configurations are explained; however, the configuration of the mounting portions 25*f* is not limited to the configuration described in the first preferred embodiment of the present invention. FIG. 5A is a cross-sectional view showing the diffusion plate holding member 25 according to a second preferred embodiment of the present invention and the lamp housing surface 14*a*, where the diffusion plate holding member 25 is attached to the lamp housing surface 14*a*.

In the present preferred embodiment of the present invention, the flat portion 25*e* of the foot portion 25*d* of the slidable leg portion 25c of each diffusion plate holding member 25 includes a hook portion 25j that has an L shape extending in the direction of the arrow 26 as shown in FIG. 5A. In this configuration, the length of each hook portion 25j is slightly shorter than the length in a longer direction of each hole 14g, and the top end of each hook portion 25j is located to the right of the end of each hole 14, which prevents the hook portion 25j from being accidentally detached out of the hole 14g.

The diffusion plate holding members 25 including the hook portions 25j are attached to the lamp housing surface 14a such that the mounting portions 25f are firstly attached to the holes 14f with the leg portions 25b and 25c warped inward, and then the hook portions 25j are inserted in the holes 14g and the warped leg portions 25b and 25c recover their forms. The diffusion plate holding members 25 including the hook portions 25j are detached from the lamp housing surface 14a in the reverse order.

The configuration that the slidable leg portions 25c of the diffusion plate holding members 25 include the hook portions 25j allows easy attachment and detachment of the diffusion plate holding members 25 to and from the lamp housing surface 14a. Thus, workability of a lighting inspection of the backlight unit 4, and workability of replacing the diffusion plate holding members 25 during a maintenance operation can be improved.

(Third Preferred Embodiment)

Figure 5B:
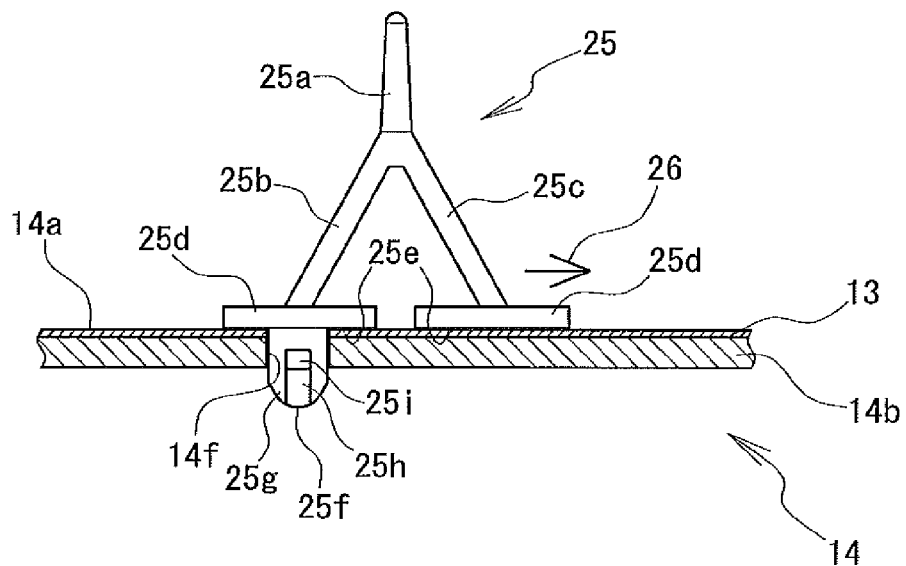
FIG. 5B is a cross-sectional view showing a diffusion plate holding member according to a third preferred embodiment of the present invention and the diffusion plate, where the diffusion plate holding member is attached to the lamp housing surface.

In the first and second preferred embodiments of the present invention described above, the configurations that the flat portions 25e of the foot portions 25d of the diffusion plate holding members 25 each include the mounting portions 25f or the hook portions 25j are explained; however, the flat portions 25e of the foot portions 25d of the diffusion plate holding members 25 do not have to include the mounting portions 25f or the hook portions 25j. FIG. 5B is a cross-sectional view showing the diffusion plate holding member 25 according to a third preferred embodiment of the present invention and the lamp housing surface 14a, where the diffusion plate holding member 25 is attached to the lamp housing surface 14a.

In the present preferred embodiment of the present invention, the foot portions 25d of the leg portions 25b of the diffusion plate holding members 25 are attached to the holes 14f via the mounting portions 25f in the fixed manner, while the foot portions 25d of the slidable leg portions 25c do not include the mounting portions 25f and instead the flat portions 25e of the foot portions 25d of the slidable leg portions 25c are only placed on the lamp housing surface 14a as shown in FIG. 5B. The holes 14g, which are provided to the lamp housing surface 14a in the first and second preferred embodiments of the present invention, are not required in the present preferred embodiment of the present invention.

The configuration that the ones of the paired foot portions 25d of the diffusion plate holding members 25 are attached to the lamp housing surface 14a while the other foot portions 25d are only placed on the lamp housing surface 14a also allows the other foot portions 25d to slide in the direction indicated by the arrow 26 to lower the height of the holding portions 25a. In addition, the configuration that the mounting portions 25f are provided only to the ones of the paired foot portions 25d allows easy attachment and detachment of the diffusion plate holding members 25 to and from the lamp housing surface 14a.

(Fourth Preferred Embodiment)

Figure 6A:
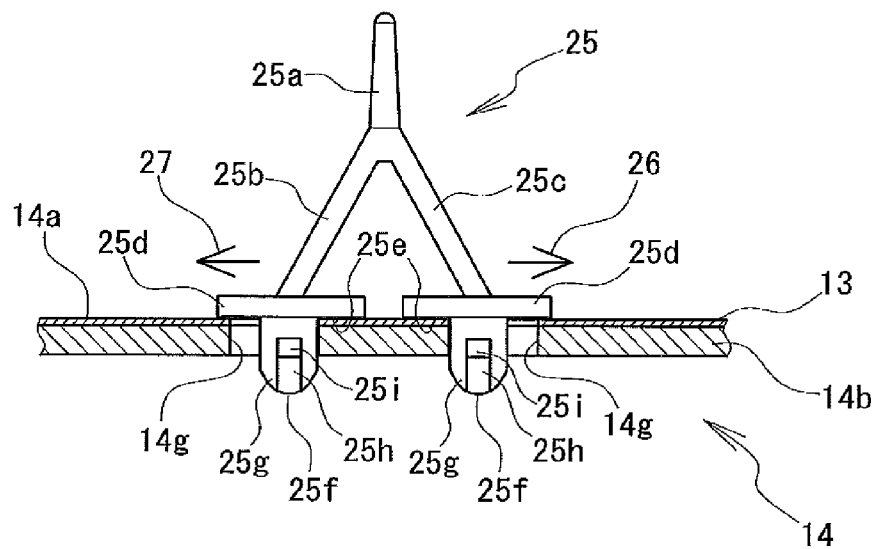
FIG. 6A is a cross-sectional view showing a diffusion plate holding member according to a fourth preferred embodiment of the present invention and the diffusion plate, where the diffusion plate holding member is attached to the lamp housing surface.

In the first and second preferred embodiments of the present invention described above, the configurations that the holes 14f and holes 14g are provided to the lamp housing surface 14a are explained; however, the configuration of holes is not limited thereto. FIG. 6A is a cross-sectional view showing the diffusion plate holding member 25 according to a fourth preferred embodiment of the present invention and the lamp housing surface 14a, where the diffusion plate holding member 25 is attached to the lamp housing surface 14a.

In the present preferred embodiment of the present invention, the diffusion plate holding members 25 have a configuration same as those used in the first preferred embodiment of the present invention; however, provided to the lamp housing surface 14a are the holes 14g to which both the mounting portions 25f of the paired foot portions 25d of each diffusion plate holding member 25 are attached as shown in FIG. 6A.

This configuration allows the foot portions 25d of the leg portions 25c to slide in the direction indicated by the arrow 26 when the tips of the holding portions 25a are pushed to the right by the diffusion plate 11, allows the foot portions 25d of the leg portions 25b to slide in the direction indicated by the arrow 27 when the tips of the holding portions 25a are pushed to the left by the diffusion plate 11, and allows the foot portions 25d of both the leg portions 25b and 25c to slide in the directions indicated by the arrows 26 and 27 when the tips of the holding portions 25a are pushed from above by the diffusion plate 11.

Having the configuration that the foot portions 25d of the leg portions 25b and/or 25c are slidable on the lamp housing surface 14a even when the tips of the holding portions 25a are pushed to the right, to the left, or from above by the diffusion plate 11, the diffusion plate holding members 25 can be disposed so as to support the diffusion plate 11 at various positions such as at the center portion and the outer region of the diffusion plate 11.

(Fifth Preferred Embodiment)

Figure 6B:
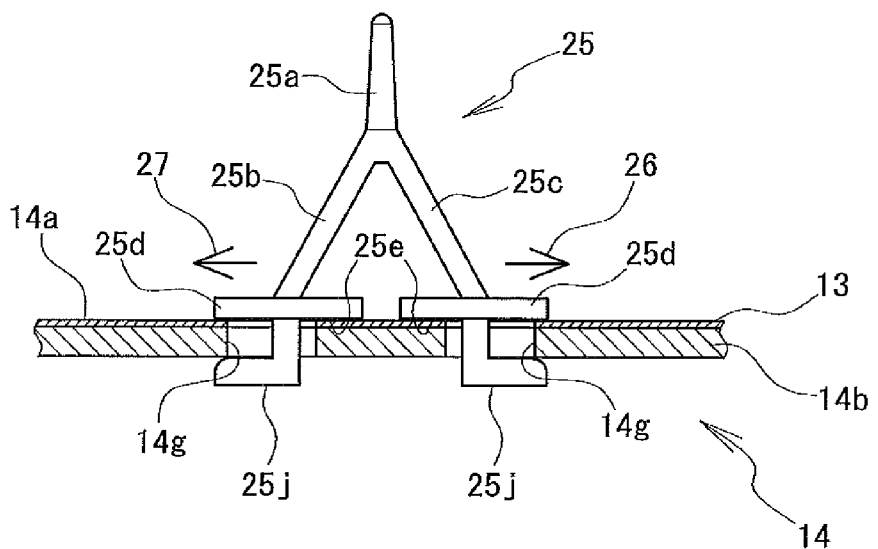
FIG. 6B is a cross-sectional view showing a diffusion plate holding member according to a fifth preferred embodiment of the present invention and the diffusion plate, where the diffusion plate holding member is attached to the lamp housing surface.

FIG. 6B is a cross-sectional view showing the diffusion plate holding member 25 according to a fifth preferred embodiment of the present invention and the lamp housing surface 14a, where the diffusion plate holding member 25 is attached to the lamp housing surface 14a. In the present preferred embodiment of the present invention, the flat portions 25e of the paired foot portions 25d of each diffusion plate holding member 25 each include the hook portions 25j, and the holes 14g to which both the hook portions 25j of each diffusion plate holding member 25 are attached are provided to the lamp housing surface 14a as shown in FIG. 6B.

This configuration allows the backlight unit 4 to obtain the same action and effect as those obtained in the fifth preferred embodiment of the present invention, and allows easy attachment and detachment of the diffusion plate holding members 25 to and from the lamp housing surface 14a. To be specific, the diffusion plate holding members 25 including the hook portions 25j are attached to the lamp housing surface 14a only by inserting the hook portions 25j in the holes 14g with the leg portions 25b and 25c warped inward and then making the warped leg portions 25b and 25c recover their forms. The diffusion plate holding members 25 including the hook portions 25j are detached from the lamp housing surface 14a only by pulling up the diffusion plate holding members 25 with the leg portions 25b and 25c warped inward. This configuration allows attachment and detachment of the diffusion plate holding members 25 to and from the lamp housing surface 14a only by warping the leg portions 25b and 25c inward, which can improve workability of a lighting inspection of the backlight unit 4, and workability of replacing the diffusion plate holding members 25 during a maintenance operation.

(Sixth Preferred Embodiment)

Figure 7:
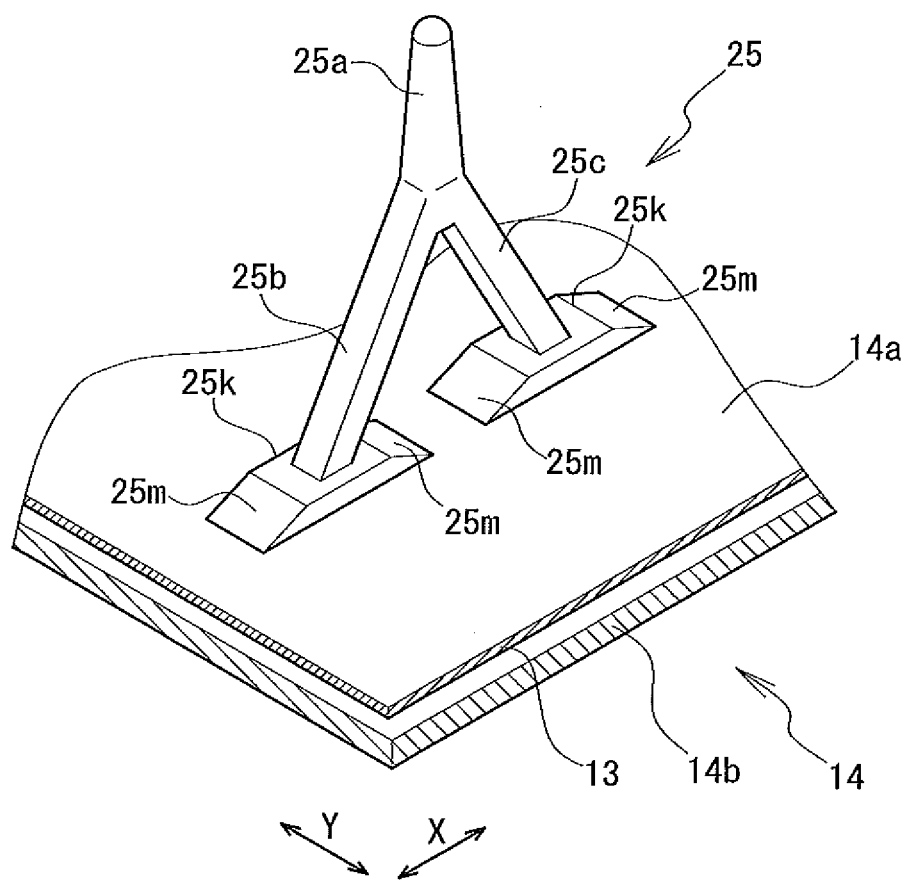
FIG. 7 is an enlarged external perspective view showing a diffusion plate holding member according to a sixth preferred embodiment of the present invention.

In the first to fifth preferred embodiments of the present invention described above, the configurations that each of the foot portions 25d has the rectangular plate shape are explained; however, the configuration of foot portions is not limited thereto. FIG. 7 is an enlarged external perspective view showing the diffusion plate holding member 25 according to a sixth preferred embodiment of the present invention and the lamp housing surface 14a, where the diffusion plate holding member 25 is attached to the lamp housing surface 14a.

In the present preferred embodiment of the present invention, each diffusion plate holding member 25 includes a pair of foot portions 25k disposed at the lower ends of the leg portions 25b and 25c, and each of the foot portions 25k has a trapezoidal shape in cross section as shown in FIG. 7. Each of the foot portions 25k includes inclined surfaces 25m on either side in the longer direction. This configuration that the foot portions 25k include the inclined surfaces (reflection surfaces) 25m that reflect light emitted from the fluorescent lamps 12 toward the diffusion plate 11 can increase use efficiency of the light emitted from the fluorescent lamps 12 and the luminosity within the light emitting surface of the diffusion plate 11.

It is to be noted that the mounting portions 25f or the hook portions 25j same as those described in the first to fifth preferred embodiments of the present invention are attached to under surfaces of the foot portions 25k, which are not shown in FIG. 7.

(Seventh Preferred Embodiment)

Figure 8:
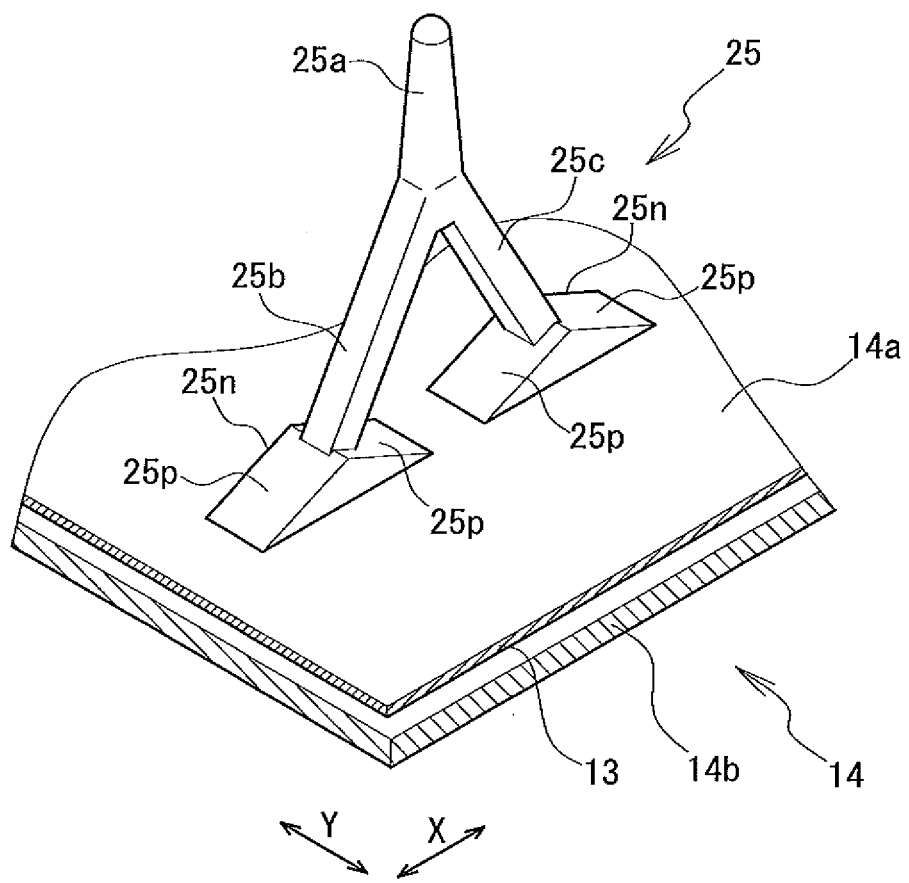
FIG. 8 is an enlarged external perspective view showing a diffusion plate holding member according to a seventh preferred embodiment of the present invention.

FIG. 8 is an enlarged external perspective view showing the diffusion plate holding member 25 according to a seventh preferred embodiment of the present invention and the lamp housing surface 14a, where the diffusion plate holding member 25 is attached to the lamp housing surface 14a.

In the present preferred embodiment of the present invention, each diffusion plate holding member 25 includes a pair of foot portions 25n disposed at the lower ends of the leg portions 25b and 25c, and each of the foot portions 25n has a triangular shape in cross section as shown in FIG. 8. Each of the foot portions 25n includes inclined surfaces 25p on either side in the longer direction. This configuration that the foot portions 25n include the inclined surfaces (reflection surfaces) 25p that reflect light emitted from the fluorescent lamps 12 toward the diffusion plate 11 can increase use efficiency of the light emitted from the fluorescent lamps 12 and the luminosity within the light emitting surface of the diffusion plate 11.

It is to be noted that the mounting portions 25f or the hook portions 25j same as those described in the first to fifth preferred embodiments of the present invention are attached to under surfaces of the foot portions 25n, which are not shown in FIG. 8.

(Eighth Preferred Embodiment)

Figure 9:
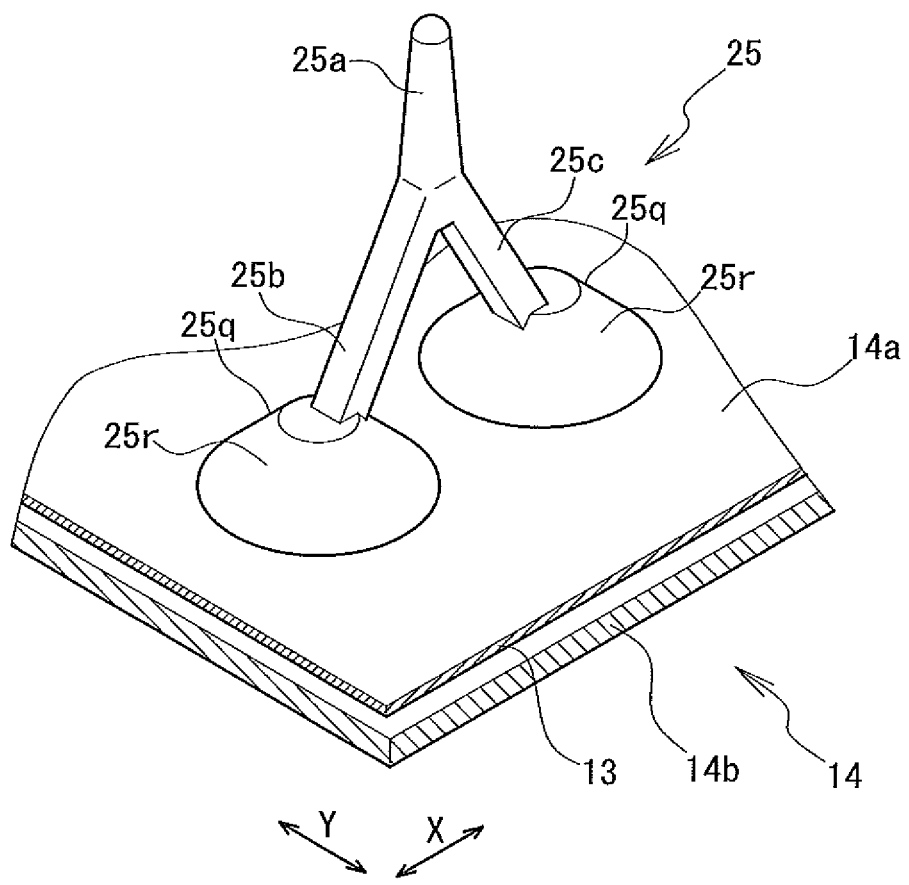
FIG. 9 is an enlarged external perspective view showing a diffusion plate holding member according to an eighth preferred embodiment of the present invention.
Figure 10A:
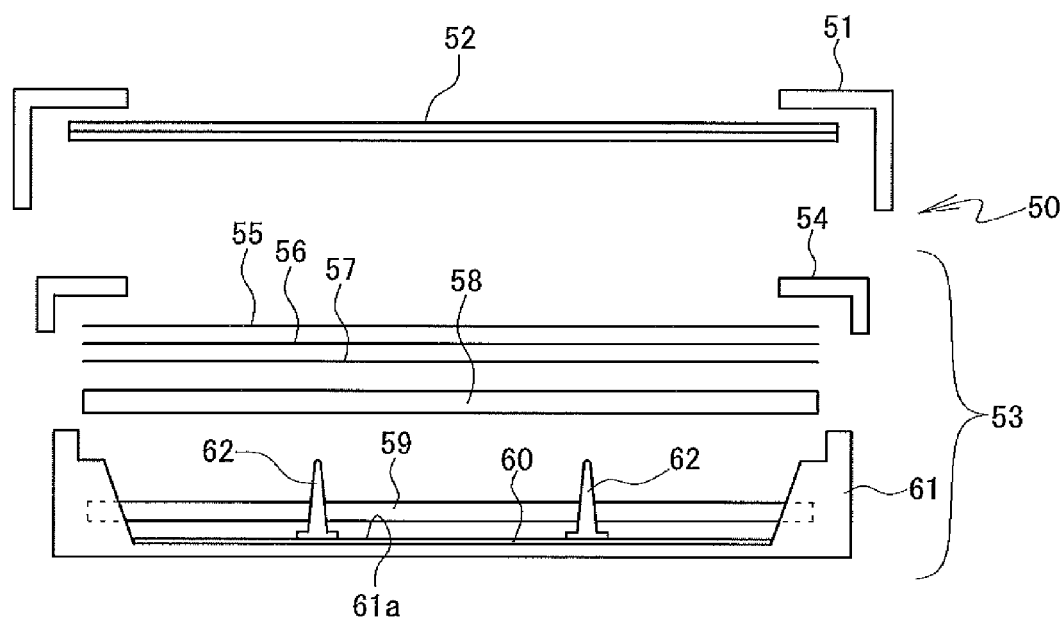
FIG. 10A is an exploded view showing a schematic configuration of a conventional liquid crystal display device.
Figure 10B:
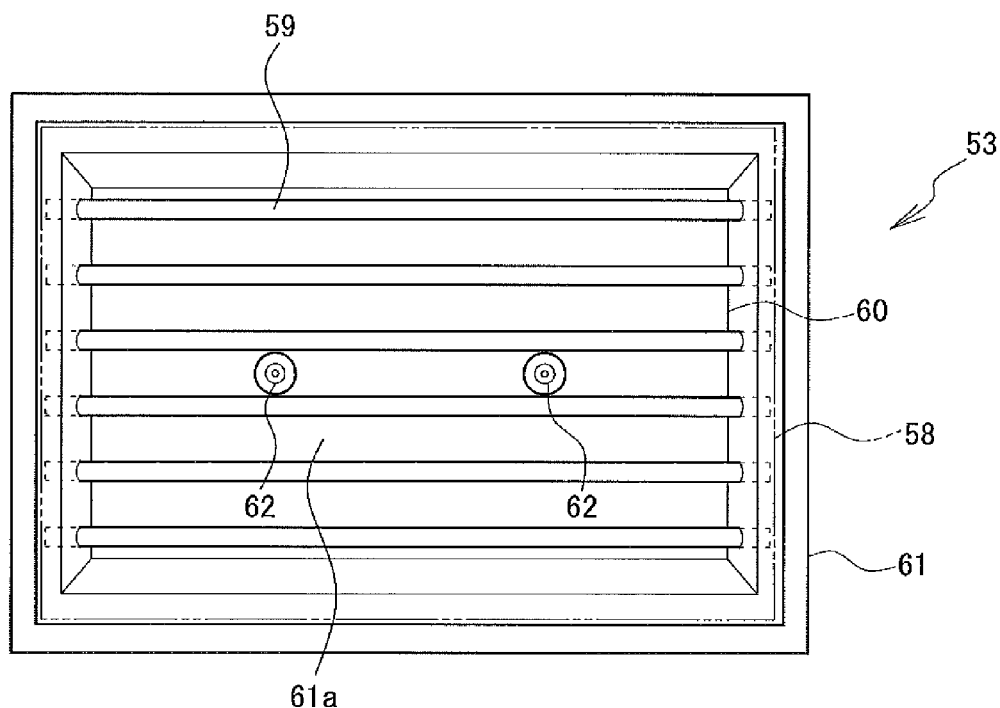
FIG. 10B is a front view showing a backlight unit to be included in the liquid crystal display device shown in FIG. 10A.
Figure 11:
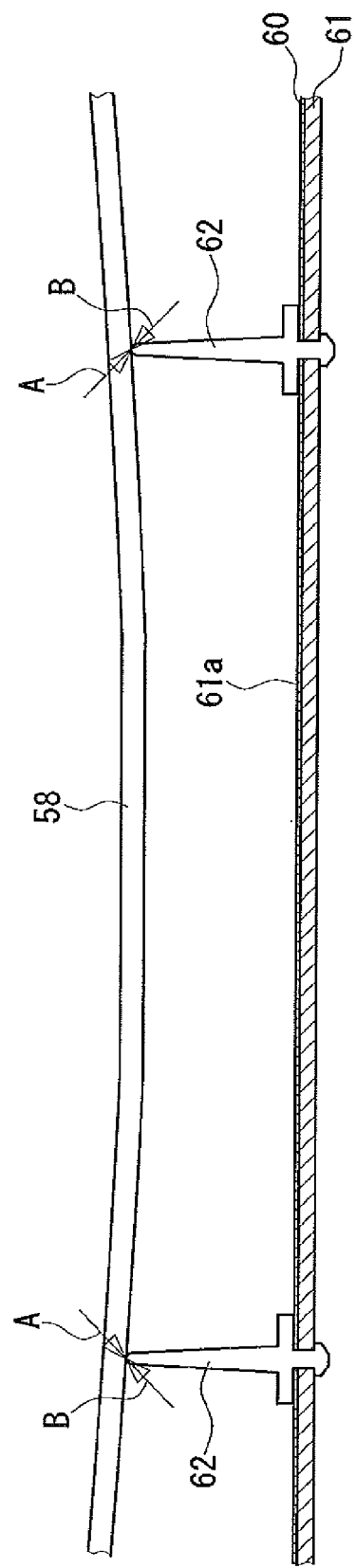
FIG. 11 is a cross-sectional view showing conventional diffusion plate holding members and a diffusion plate, where the conventional diffusion plate holding members hold the diffusion plate.

FIG. 9 is an enlarged external perspective view showing the diffusion plate holding member 25 according to an eighth preferred embodiment of the present invention and the lamp housing surface 14a, where the diffusion plate holding member 25 is attached to the lamp housing surface 14a.

In the present preferred embodiment of the present invention, each diffusion plate holding member 25 includes a pair of foot portions 25q disposed at the lower ends of the leg portions 25b and 25c, and each of the foot portions 25q has a conical shape tapering off to the upper end as shown in FIG. 9. Each of the foot portions 25q includes an inclined surface 25r on a lateral side of each conical-shaped foot portion 25q. This configuration that the foot portions 25q include the inclined surfaces (reflection surfaces) 25r that reflect light emitted from the fluorescent lamps 12 toward the diffusion plate 11 can increase use efficiency of the light emitted from the fluorescent lamps 12 and the luminosity within the light emitting surface of the diffusion plate 11.

It is to be noted that the mounting portions 25f or the hook portions 25j same as those described in the first to fifth preferred embodiments of the present invention are attached to under surfaces of the foot portions 25q, which are not shown in FIG. 9.

Because the backlight unit 4 has the configurations described above that the diffusion plate holding members 25 arranged to hold the diffusion plate 11 that defines the optical member include the leg portions 25b and 25c elastically deformable in the direction in which the leg portions 25b and 25c approach and leave each other, and at least the ones of the paired foot portions 25d disposed at the lower ends of the leg portions 25b and 25c are placed in the slidable manner on the lamp housing surface 14a, the paired leg portions 25b and 25c open and close by the slide of the foot portions 25d, which allows each holding portion 25a to change its height with respect to the lamp housing surface 14a.

Thus, when the tips of the holding members 25a are pushed by the warped diffusion plate 11, the paired leg portions 25b and 25c open to lower the height of the holding portions 25a, that is, lower the positions where the holding portions 25a are in contact with the diffusion plate 11. Consequently, contact loads at the positions where the holding portions 25a are in contact with the diffusion plate 11 can be lessened, which can prevent occurrence of a noise that is caused when the diffusion plate holding members 25 are brought into contact with the diffusion plate 11.

It is also preferable that the backlight unit 4 has the configuration that the ones of the paired foot portions 25d of the diffusion plate holding members 25 are attached in the fixed manner to the holes 14f provided to the lamp housing surface 14a, and the other foot portions 25d are attached in the slidable manner in the holes 14g provided to the lamp housing surface 14a (the configuration according to the first or second preferred embodiment of the present invention). It is also preferable that the backlight unit 4 has the configuration that the ones of the paired foot portions 25d of the diffusion plate holding members 25 are attached in the fixed manner to the holes 14f provided to the lamp housing surface 14a, and the other foot portions 25d are placed in the slidable manner on the lamp housing surface 14a (the configuration according to the third preferred embodiment of the present invention). It is also preferable the backlight unit 4 has the configuration that the ones of the paired foot portions 25d of the diffusion plate holding members 25 are attached in the slidable manner to the holes 14g provided to the lamp housing surface 14a, and the other foot portions 25d of the diffusion plate holding members 25 are attached in the slidable manner to the holes 14g provided to the lamp housing surface 14a (the configuration according to the fourth or fifth preferred embodiment of the present invention).

With any one of these configurations, at least the ones of the foot portions 25d disposed at the lower ends of the leg portions 25b and 25c can be placed in the slidable manner on the lamp housing surface 14a with a simple structure.

Further, it is also preferable that the backlight unit 4 has the configuration that the foot portions 25d of the diffusion plate holding members 25 include the mounting portions 25f that are insertable in and removable from the holes 14f and 14g. With this configuration, workability of a lighting inspection of the backlight unit 4, and workability of replacing the diffusion plate holding members 25 during a maintenance operation can be improved. In this configuration, it is preferable that the mounting portions 25f are defined by the hook portions 25j each of which has the L shape extending in the direction the foot portions 25*d* slide. This configuration allows easy attachment and detachment of the diffusion plate holding members 25 to and from the holes 14*f* and 14*g*, and allows easy sliding of the foot portions 25*d*.

It is also preferable that the backlight unit 4 has the configuration that the foot portions 25*d* attached in the fixed manner to the lamp housing surface 14*a* are disposed closer to the center of the diffusion plate 11 while the other foot portions 25*d* attached in the slidable manner to the lamp housing surface 14*a* are disposed closer to the outer region of the diffusion plate 11. With this configuration, if the diffusion plate holding members 25 are disposed surrounding (sandwiching) the center of the diffusion plate 11, the directions in which the diffusion plate holding members 25 are pushed by the diffusion plate 11 when the center portion of the diffusion plate 11 is warped can be made to coincide with the directions in which the foot portions 25*d* slide. Thus, the foot portions 25*d* can effectively slide in accordance with the warp of the diffusion plate 11.

Further, it is also preferable that the backlight unit 4 has the configuration that the foot portions 25*d* of the diffusion plate holding members 25 include the flat portions 25*e* that are in contact with the lamp housing surface 14*a*. With this configuration, the foot portions 25*d* can slide on the lamp housing surface 14*a* more easily. If each of the flat portions 25*e* has the rectangular shape, the flat portions 25*e* can easily cover in the holes 14*g* provided to the lamp housing surface 14*a* when the foot portions 25*d* slide, which can prevent light from leaking from the holes 14*g*.

It is also preferable that the backlight unit 4 has the configuration that each of the foot portions 25*k* of the diffusion plate holding members 25 has the trapezoidal shape in cross section as described in the sixth preferred embodiment of the present invention, the configuration that each of the foot portions 25*n* of the diffusion plate holding members 25 has the triangular shape in cross section as described in the seventh preferred embodiment of the present invention, or the configuration that each of the foot portions 25*q* of the diffusion plate holding members 25 has the conical shape as described in the eighth preferred embodiment of the present invention. With any one of these configurations, the foot portions of the diffusion plate holding members 25 include the inclined surfaces (reflection surfaces) that reflect light emitted from the fluorescent lamps 12 toward the diffusion plate 11, which can increase use efficiency of the light emitted from the fluorescent lamps 12 and the luminosity within the light emitting surface of the diffusion plate 11.

The foregoing description of the backlight unit and the display device according to the preferred embodiments of the present invention has been presented for purposes of illustration and description with reference to the drawings. However, it is not intended to limit the present invention to the preferred embodiments, and modifications and variations are possible as long as they do not deviate from the principles of the present invention. For example, the configurations to hold the diffusion plate that defines the optical member having the flat plate shape in the backlight unit are explained above; however, the present invention is not limited thereto. A transparent light guide plate is preferably used as the optical member having the flat plate shape. In addition, the shape of the mounting portions provided to the foot portions of the diffusion plate holding members is not limited to the one described above, and the mounting portions may have other various shapes. Accordingly, the holes to which the mounting portions are to be attached are made to have a shape such as a round and triangular shape so as to correspond to the shape of the mounting portions.

The backlight unit described above has the configuration that the fluorescent lamps are used as the light sources; however, the present invention is not limited thereto. The backlight unit preferably has a configuration that light-emitting diodes arranged vertically and horizontally on the lamp housing surface are used as the light sources. When the light-emitting diodes are turned on, the optical member such as the diffusion plate is warped due to thermal expansion of the optical member caused by a hot environment inside the backlight unit, so that the use of the holding members according to the preferred embodiments of the present invention can prevent occurrence of a noise that is caused when the holding members are brought into contact with the optical member.

The invention claimed is:

1. A backlight unit comprising:
a chassis comprising a housing surface arranged to house a plurality of light sources;
an optical member having a flat plate shape and disposed above the light sources; and
holding members arranged to hold the optical member and attached to the housing surface,
wherein each of the holding members comprises:
a holding portion arranged to hold the optical member; and
a pair of leg portions that extend from the holding portion, are elastically deformable in a direction in which the leg portions approach and leave each other, and comprise a pair of foot portions disposed at lower ends of the leg portions, at least one of the paired foot portions being placed in a manner slidable on the housing surface in the direction in which the leg portions approach and leave each other.

2. The backlight unit according to claim 1, wherein ones of the paired foot portions are attached in a fixed manner to holes provided to the housing surface, and the other foot portions are attached in a slidable manner to holes provided to the housing surface.

3. The backlight unit according to claim 1, wherein ones of the paired foot portions are attached in a fixed manner to holes provided to the housing surface, and the other foot portions are placed in a slidable manner on the housing surface.

4. The backlight unit according to claim 1, wherein ones of the paired foot portions are attached in a slidable manner to holes provided to the housing surface, and the other foot portions are attached in a slidable manner to holes provided to the housing surface.

5. The backlight unit according to claim 2, wherein the foot portions attached in the fixed manner are disposed closer to the center of the optical member while the other foot portions attached in the slidable manner are disposed closer to an outer region of the optical member.

6. The backlight unit according to claim 1, wherein each of the foot portions comprises a flat portion that is in contact with the housing surface.

7. The backlight unit according to claim 6, wherein each of the flat portions has a rectangular shape.

8. The backlight unit according to claim 1, wherein each of the foot portions has a trapezoidal shape in cross section.

9. The backlight unit according to claim 1, wherein each of the foot portions has a triangular shape in cross section.

10. The backlight unit according to claim 1, wherein each of the foot portions has a conical shape.

11. The backlight unit according to claim 2, wherein the foot portions each comprise mounting portions that are insertable in and removable from the holes.

12. The backlight unit according to claim 11, wherein the mounting portions each comprise hook portions, and each of the hook portions has an L shape extending in a direction in which the foot portions slide.

13. The backlight unit according to claim 2, wherein each of the holes has a long opening shape extending in a direction in which the foot portions slide.

14. The backlight unit according to claim 1, wherein each pair of the leg portions has an inverted V shape.

15. The backlight unit according to claim 1, wherein the light sources comprise fluorescent lamps.

16. The backlight unit according to claim 1, wherein the light sources comprise light-emitting diodes.

17. A display device comprising:
   a display panel having an image display region; and
   the backlight unit according to claim 1 that is disposed behind the display panel to illuminate the display panel with light.

18. The display device according to claim 17, wherein the display panel comprises a liquid crystal display panel.

* * * * *